Patented Nov. 17, 1953

2,659,759

UNITED STATES PATENT OFFICE 2,659,759

PRODUCTION OF 6-CHLORO-O-CRESOL

John W. Zemba, Midland, Mich., assignor to The Dow Chemical Company, Midland, Mich., a corporation of Delaware No Drawing. Application December 26, 1950, Serial No. 202,799

1 Claim. (Cl. 260—623)

This invention relates to the production of pure 6-chloro-o-cresol by the chlorination of o-cresol, and to the recovery of the former from a mixture thereof with o-cresol.

The chlorination of o-cresol was carried out many years ago. For example, as early as 1888 Jackson (J. Prak. Chemie, 38, 328–9) stated that o-cresol can be chlorinated in the presence of iron. This chlorination can be carried out at 35 to 60° C. in the absence of any catalyst to produce valuable 6-chloro-o-cresol and 4-chloro-o-cresol plus small amounts of dichloro-o-cresols. It is desirable to minimize the yield of dichloro-o-cresols by using an amount of chlorine insufficient to effect monochlorination of all the o-cresol employed; accordingly, a substantial amount of unreacted o-cresol remains after chlorination. However, although the 4-chloro-o-cresol can be recovered in pure form by fractional distillation of the reaction mixture, both the 6-chloro-o-cresol and the o-cresol boil at about 191° C. at 760 mm. Hg so that recovery of the desired 6-chloro-o-cresol in pure form is difficult.

The present invention is based upon the discovery of a method for chlorinating o-cresol according to which both 6-chloro-o-cresol and 4-chloro-o-cresol are readily recovered in pure form by distillation.

The principal object of the present invention is to provide a method for chlorinating o-cresol which permits the recovery by distillation of 6-chloro-o-cresol.

A further object is to provide a method of recovering pure 6-chloro-o-cresol from a mixture thereof with o-cresol.

According to the invention o-cresol is treated with from 0.9 to 0.99 mol of chlorine per mol of o-cresol to produce a mixture of chlorinated products including 4-chloro-o-cresol, dichloro-o-cresols, 6-chloro-o-cresol and unreacted o-cresol. At least the two last-named compounds are then recovered from the mixture by fractional distillation. The 6-chloro-o-cresol-o-cresol mixture is then treated with one mol of chlorine per mol of o-cresol therein at a temperature from 35 to 60° C. to chlorinate the o-cresol to 6-chloro-o-cresol and 4-chloro-o-cresol. These products are then separated in pure form by fractional distillation.

According to another embodiment of the invention a mixture comprising 6-chloro-o-cresol and o-cresol is treated with one mol of chlorine per mol of o-cresol therein at a temperature from 35 to 60° C. to chlorinate the o-cresol to 6-chloro-o-cresol and 4-chloro-o-cresol. These products are then separated in pure form by fractional distillation.

In carrying out either chlorination step of the method of the invention it is essential that a temperature between 35 and 60° C. be employed, as indicated above. At a temperature lower than about 35° C. crystallization of o-cresol makes chlorination impracticable. At a temperature higher than about 60° C. dichlorination proceeds to such an extent that the yield of the desired 6-chloro-o-cresol and 4-chloro-o-cresol is decreased unreasonably. It is also essential that the mol ratio of chlorine to o-cresol be from 0.9:1 to 0.99:1 when the latter is chlorinated alone. When the ratio of chlorine used is within the above limits, a substantial portion of the o-cresol employed is chlorinated, and dichlorination is minimized. When a mixture of 6-chloro-o-cresol and o-cresol is chlorinated according to the invention it is important to use the amount of chlorine theoretically necessary to monochlorinate the o-cresol in the mixture. Dichlorination does not proceed to a substantial extent, and essentially all the o-cresol is chlorinated so that the final separation can be effected.

The rate of chlorine addition is not critical; it can be added as fast as it is absorbed by the solution being chlorinated.

Fractional distillation is carried out in the process of the invention in the usual way. A reasonably efficient column is required.

The following example illustrates a preferred way of carrying out the process of the invention, but is to be construed as illustrative rather than limitative:

Example

Chlorine, at a rate of 5 to 6 pounds per hour, was bubbled into 440 pounds (4.05 pound moles) of o-cresol maintained at a temperature from 50 to 55° C. in a Pfaudler kettle. HCl generated by chlorination of the o-cresol was passed through an exit tube leaving the Pfaudler kettle and was absorbed in a caustic scrubber. The chlorine addition was continued for 63 hours until a total of 284 pounds of chlorine (4.01 pounds moles) had been bubbled into the o-cresol. The reaction mixture was then blown with air for 8 hours to distill any residual HCl, and was washed with 20 gallons of water. The lower oily layer was separated, and dried with anhydrous calcium chloride. A 290 pound sample of the dried product was fractionated, using a 10:1 reflux ratio, to effect a crude separation. The products recovered consisted of 5½ pounds of water, 74½ pounds of a mixture of 6-chloro-o-cresol and unreacted o-cresol, plus a trace of 4,6-dichloro-o-cresol, and 106 pounds of 4- chloro-o-cresol. The 6-chloro-o-cresol-o-cresol, mixture could not be resolved by fractionation. It was found to contain about 10 per cent of o-cresol. This fractionation cut was combined with other cuts of essentially the same composition produced as described above, and a 323 pound sample of the resulting mixture (containing about 0.46 pound mol of o-cresol) was placed in a Pfaudler kettle, and heated to a temperature from 50 to 55° C. Chlorine, at a rate of 5 to 6 pounds per hour, was bubbled into the mixture in the kettle. The chlorine addition was continued for 6 hours until a total of 33 pounds of chlorine (0.47 pound mol) had been bubbled into the mixture. Air was then blown through the reaction mixture as described above, which was then washed with 20 gallons of water. The organic layer was separated, washed with an additional 20 pounds of water, and separated from the second wash water. The total recovery of organic material was 315 pounds. A 311 pound portion of this material was placed in the still of a fractionating column. Fractional distillation yielded 254 pounds of 6-chloro-o-cresol. This material had the following physical properties: freezing point 1.2° C., index of refraction 25°/D 1.5423, specific gravity 25°/25° 1.1950. It contained 24.83 per cent of chlorine (theory 24.87).

I claim:

A method of preparing substantially pure 6-chloro-o-cresol which comprises (1) treating o-cresol with from 90 to 99 mol per cent thereof of chlorine at a temperature from 35° to 60° C. to produce a mixture consisting essentially of 4-chloro-o-cresol, 6-chloro-o-cresol, dichloro-o-cresols and unreacted o-cresol, (2) subjecting this mixture to fractional distillation to separate a fraction consisting essentially of 6-chloro-o-cresol and o-cresol and substantially free of 4-chloro-o-cresol and dichlorocresols, (3) treating this fraction with chlorine in a proportion equimolar to the o-cresol therein at a temperature from 35° to 60° C. to chlorinate the o-cresol, and (4) subjecting the resulting chlorinated fraction to fractional distillation to separate substantially pure 6-chloro-o-cresol.

JOHN W. ZEMBA.

References Cited in the file of this patent

UNITED STATES PATENTS

| Number | Name | Date |
|---|---|---|
| 2,494,993 | Foster | Jan. 17, 1950 |